Figure 5:
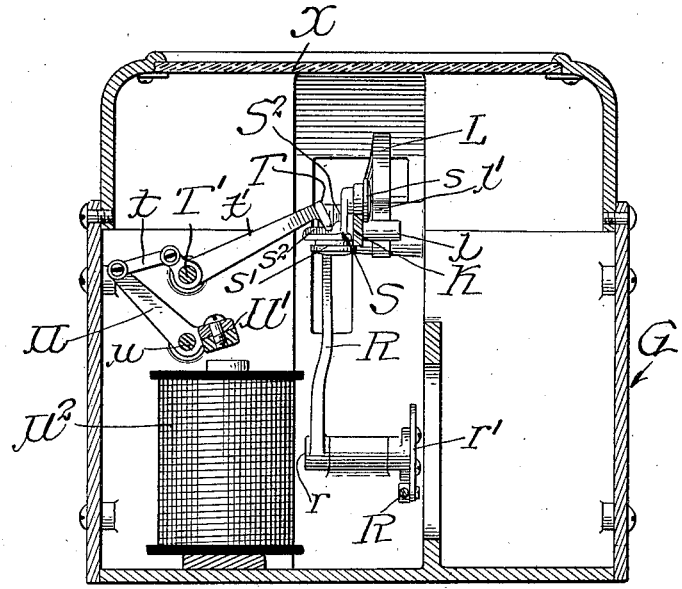

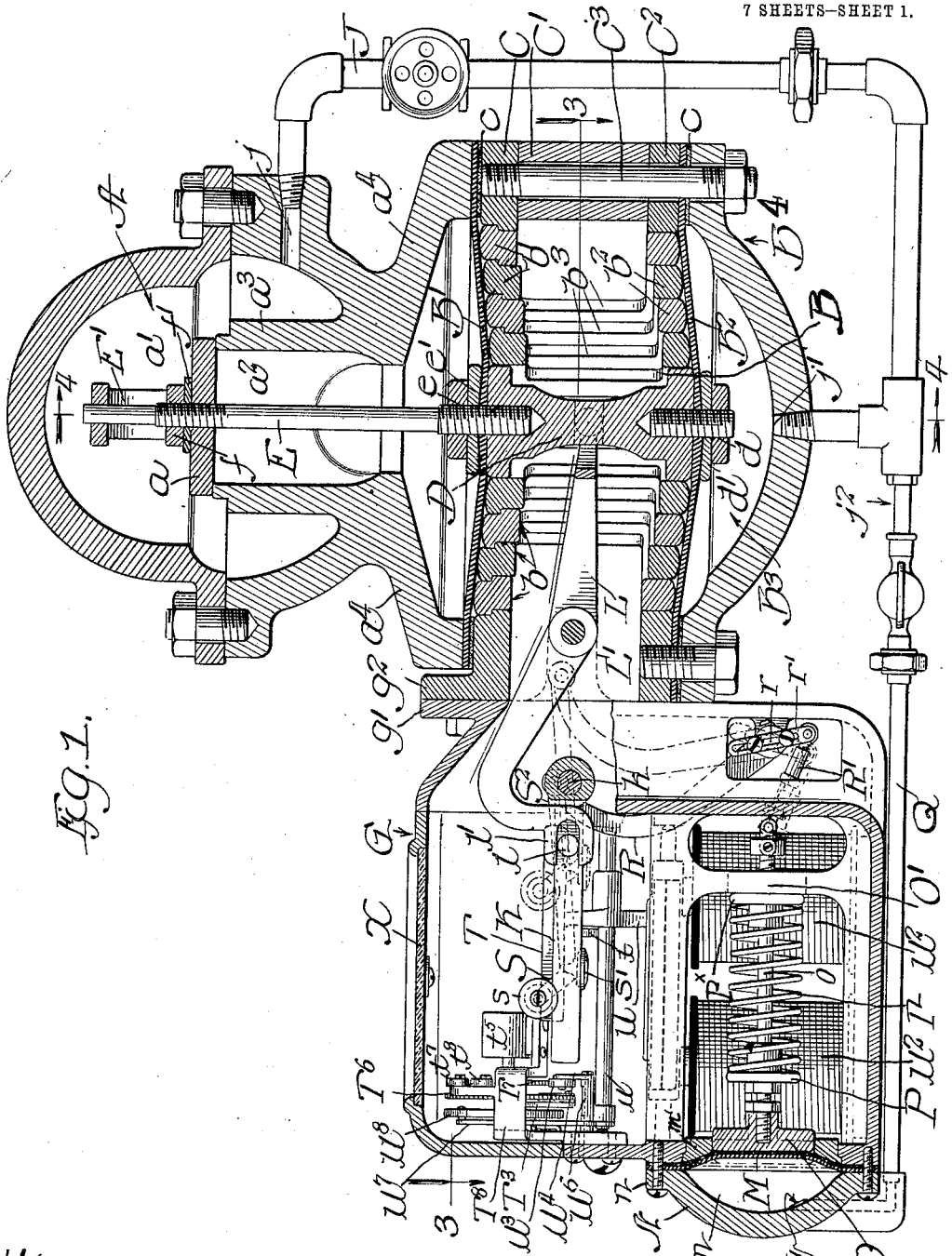

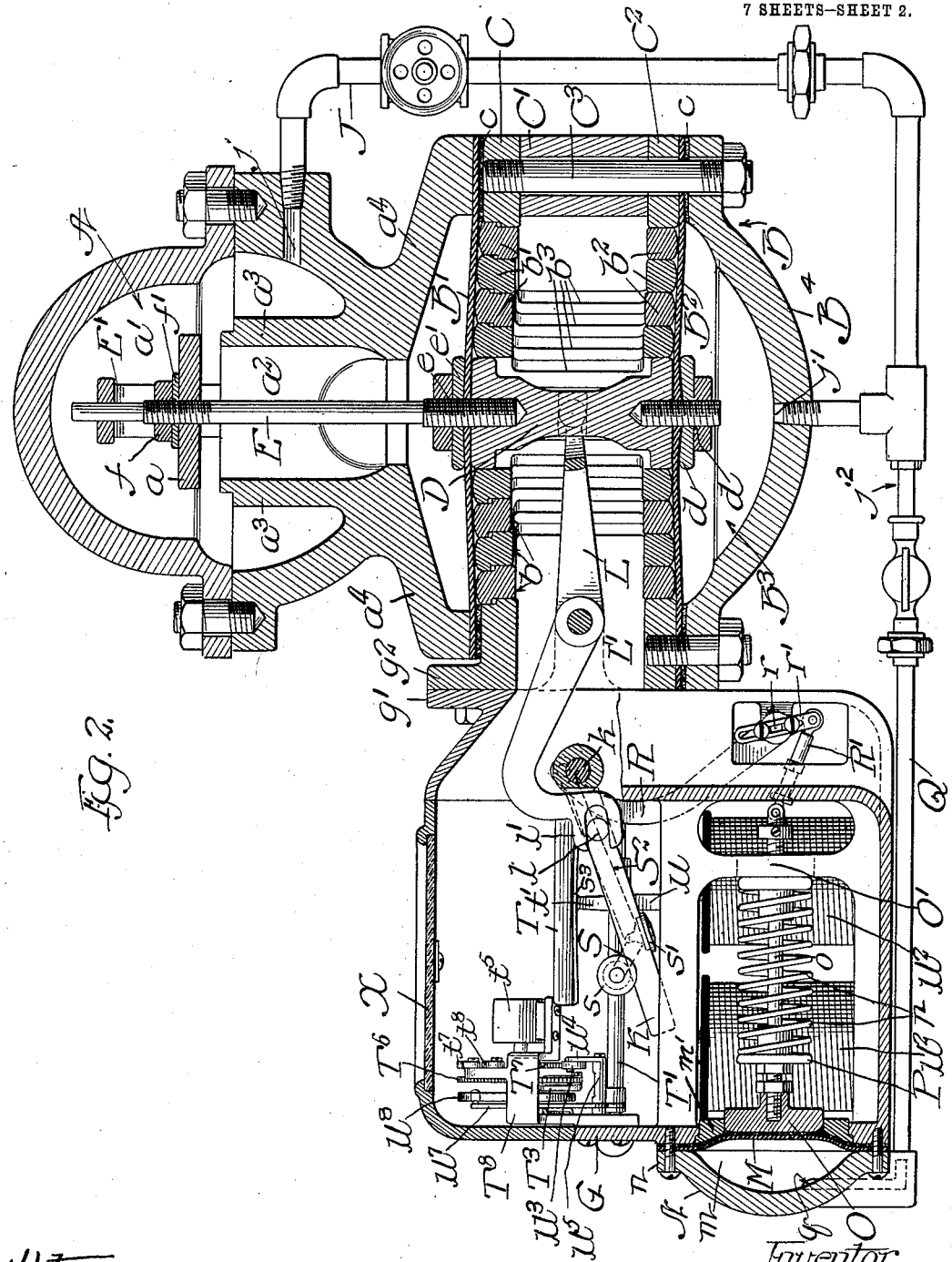

A. G. ALEXANDER.
INTEGRATING FLUID METER.
APPLICATION FILED AUG. 14, 1909.
1,020,735.
Patented Mar. 19, 1912.
7 SHEETS—SHEET 3.
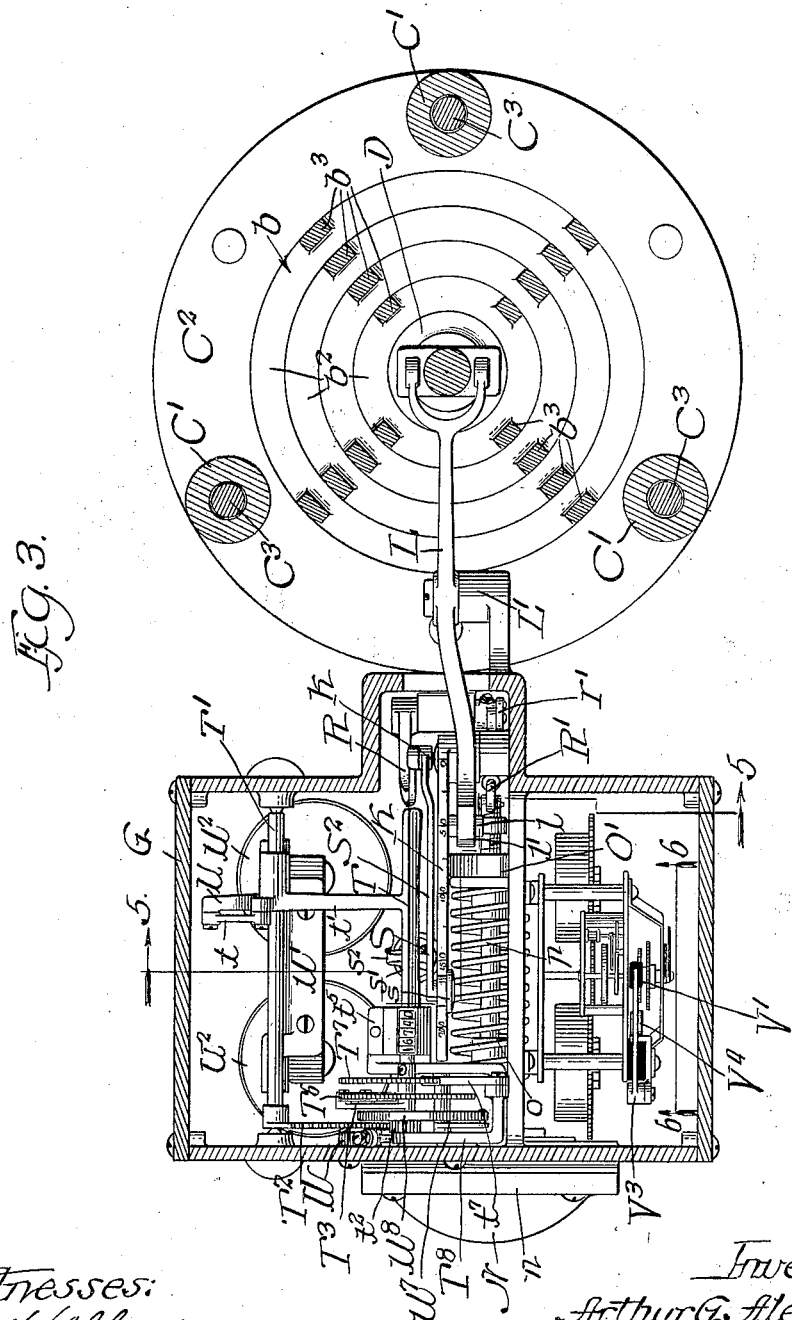

A. G. ALEXANDER.
INTEGRATING FLUID METER.
APPLICATION FILED AUG. 14, 1909.
1,020,735.
Patented Mar. 19, 1912.
7 SHEETS—SHEET 4.
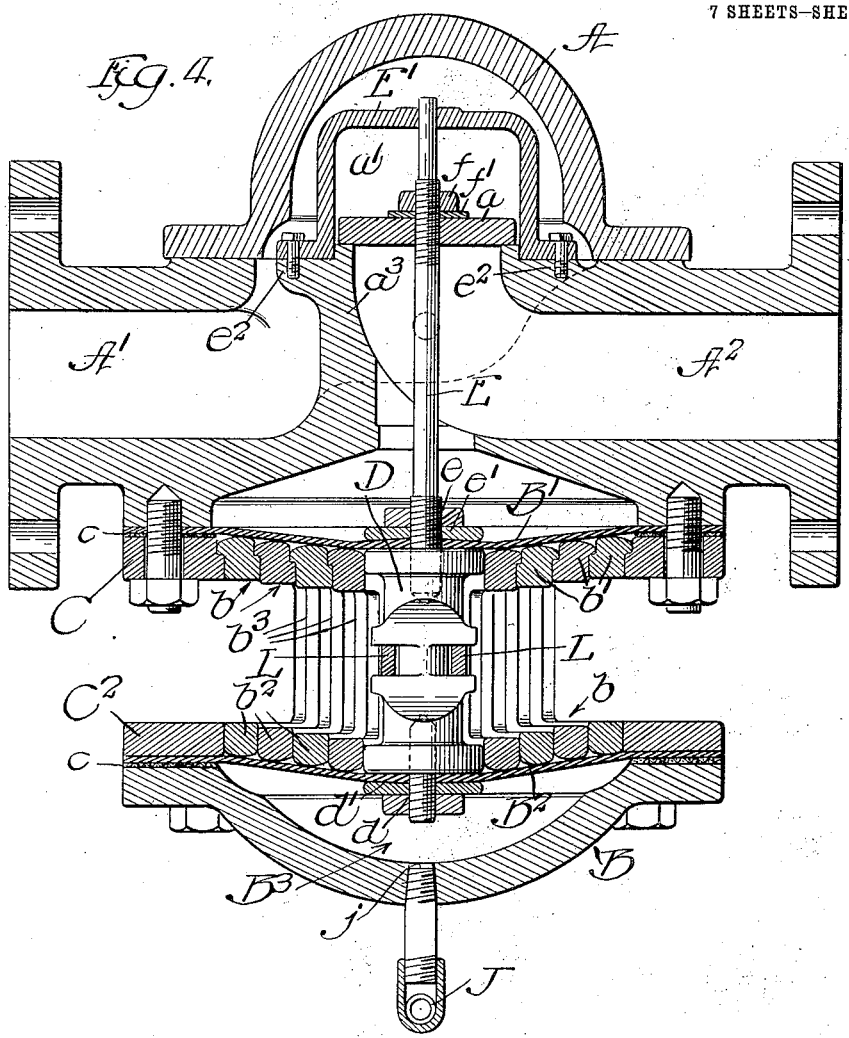
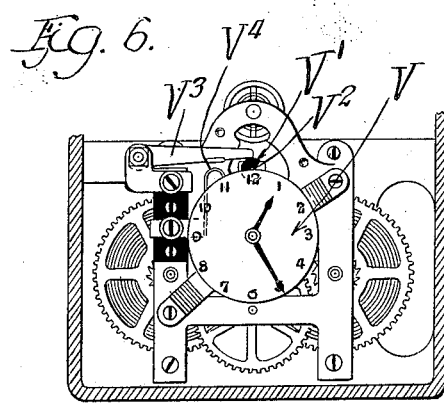
Witnesses:
Inventor
Arthur G. Alexander

A. G. ALEXANDER.
INTEGRATING FLUID METER.
APPLICATION FILED AUG. 14, 1909.

1,020,735.

Patented Mar. 19, 1912.

7 SHEETS—SHEET 5.

Witnesses:
T. N. Alfred
G. R. Wilkins

Inventor
Arthur G. Alexander
by Poole + Brown
Attys

A. G. ALEXANDER.
INTEGRATING FLUID METER.
APPLICATION FILED AUG. 14, 1909.
1,020,735.
Patented Mar. 19, 1912.
7 SHEETS—SHEET 6.
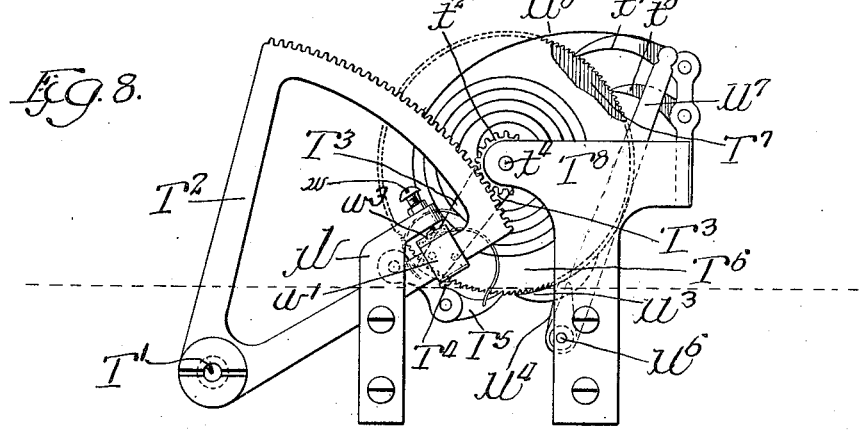
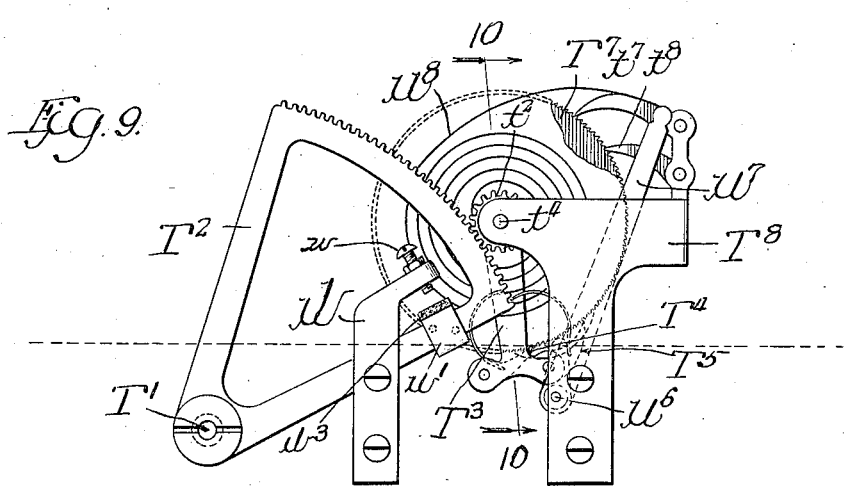
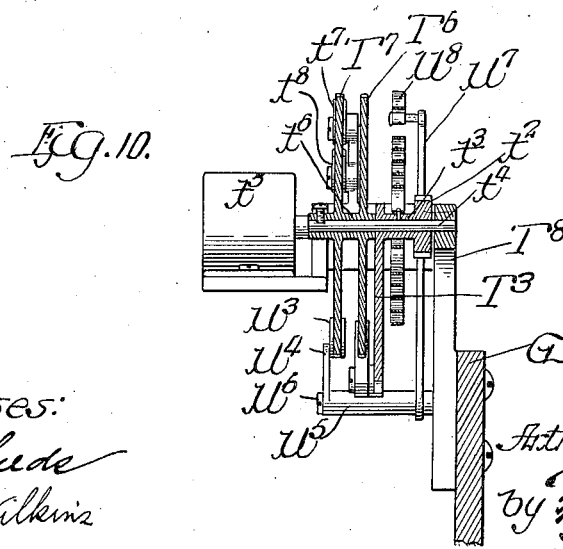

A. G. ALEXANDER.
INTEGRATING FLUID METER.
APPLICATION FILED AUG. 14, 1909.

1,020,735.

Patented Mar. 19, 1912.

7 SHEETS—SHEET 7.

Witnesses:
J. W. Alfred
G. R. Wilkins

Inventor
Arthur G. Alexander
by Poole & Brown
Attys

UNITED STATES PATENT OFFICE.

ARTHUR G. ALEXANDER, OF CHICAGO, ILLINOIS.

INTEGRATING FLUID-METER.

1,020,735.        Specification of Letters Patent.        Patented Mar. 19, 1912.

Application filed August 14, 1909.  Serial No. 512,825.

*To all whom it may concern:*

Be it known that I, ARTHUR G. ALEXANDER, a citizen of the United States, and a resident of Chicago, in the county of Cook and State of Illinois, have invented certain new and useful Improvements in Integrating Fluid-Meters; and I do hereby declare that the following is a full, clear, and exact description thereof, reference being had to the accompanying drawings, and to the letters of reference marked thereon, which form a part of this specification.

This invention relates to an integrating fluid meter for measuring the weight of fluid which flows through a pipe or conduit in a given length of time, and for registering, by means of a suitable counter, the number of units by weight as, for example, the number of pounds, which have passed through the pipe or conduit during said time.

The improved meter may be used with any fluid, but the example illustrated and described herein is particularly adapted for use in measuring steam.

An apparatus embodying my invention embraces in its preferred form: (1) a chamber interposed in the pipe or conduit through which the fluid to be measured is passing, provided with induction and eduction compartments, separated by a partition having an opening; (2) a valve adapted to close the opening between said compartments; (3) a diaphragm operatively connected to the valve and adapted to open the valve proportionately to the volume of fluid passing; (4) a second diaphragm subjected to the pressure in the induction compartment of the chamber and arranged to move proportionately to the variations in said pressure; (5) a graduated, pivoted bar or scale beam adapted to be depressed in proportion to the movement of the first diaphragm and provided with a slide adapted to be moved along said graduated beam in proportion to the movement of the second diaphragm; and (6) a counter operated by a movable member adapted, at regular time intervals, to measure the displacement of said slide from its initial position.

My improved meter depends for its operation upon the well known relation of the pressure, volume and density of fluids. For example, the density of a gas, that is to say, the weight of gas contained in a cubic foot of the gas, is proportional to the pressure when the volume is constant. It is also proportional to the volume when the pressure is constant. The density of a gas is therefore proportional when both pressure and volume vary to the product of the volume multiplied by the pressure. As the counter is to register the number of units by weight passing through the conduit for each unit of time, and as this is proportional to the density of the gas passing during such unit of time, it is apparent that if a registering device be operated by a mechanism which will be moved through a distance proportional to the density at the end of each of such time intervals, the registering device may be graduated to read in units of weight, and that, assuming the density of the gas passing throughout the time intervals to be the same as at the end of said intervals, the registering device may be geared to correctly integrate and indicate in units of weight the amount of gas which has passed through the conduit for any given length of time. To provide such a mechanism I make use of a device similar to a scale beam and the slide thereon, and the registering device is operated by a meter member adapted to move periodically from an initial position to measure the resultant displacement of the slide. It is apparent that the displacement of the slide will depend upon its relative movement along the beam and also upon the angle through which the beam has been swung. Its actual or resultant displacement will be proportional to its distance from the fulcrum of the beam multiplied by the sine of the angle through which the scale beam has been swung, or in other words, its actual displacement will be proportional to the product of its displacement along the scale beam, and the sine of the angle of swing of the beam. Accordingly, the beam is connected by suitable levers to the diaphragm which operates the valve so that its movement produces a proportional swing of the scale beam, and the diaphragm registering the pressure in the induction chamber is connected to the slide to produce a relative movement of the slide along the beam in proportion to the pressure in the induction chamber. As the distance that the valve opens is proportional to the volume passing through the chamber, and as the displacement of the slide is proportional to the relative movement along the beam, multiplied by the sine of the angle of the beam, it is apparent that said displacement is proportional to the product of the volume multiplied by the pressure, or in other words, is proportional to the density. The member actuating the registering device will, therefore, at the end of each time interval travel a distance proportional to the density of the gas passing through the chamber at the time of its movement. By providing suitable mechanism to measure this displacement at regular intervals, as, for example, at the end of each minute, the number of pounds passing through the chamber during any interval of time is registered.

My invention consists in the combination of elements hereinafter more particularly described and pointed out in the appended claims.

Figure 7:
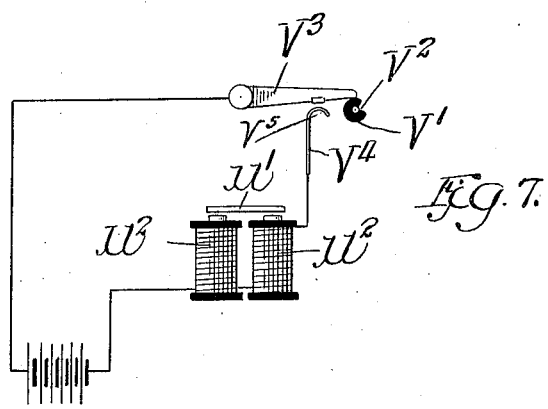
Figure 11:
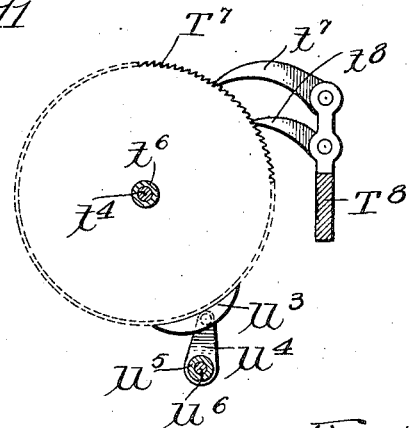
Figure 12:
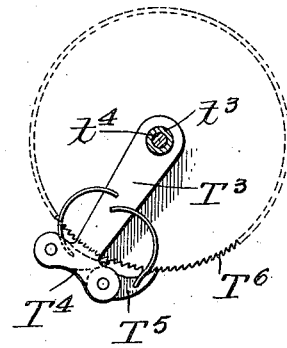
Figure 14:
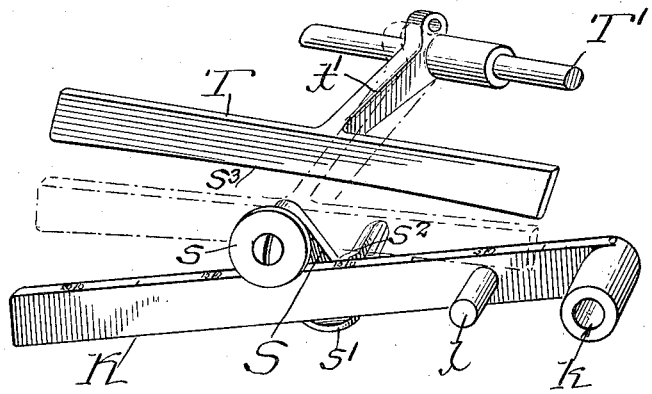
Figure 13:
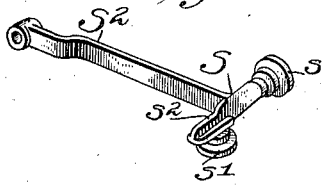

Passing now to a more specific description of the machine, in the drawings:—Figure 1 is a vertical section through the chamber containing the valve, through the diaphragms and through the meter, showing the operative parts thereof in elevation, when the valve is in closed position, as when no fluid is flowing through the chamber. Fig. 2 is a similar view showing the relation of the parts when the valve is in open position. Fig. 3 is a horizontal section through Fig. 1 on the line 3—3 thereof. Fig. 4 is a vertical section through Fig. 1 on the line 4—4 thereof. Fig. 5 is a vertical section through Fig. 3 on the line 5—5 thereof. Fig. 6 is a vertical section, at right angles to that of Fig. 5, through Fig. 3, on the line 6—6 thereof. Fig. 7 is a diagrammatic view of the electric connection by means of which the register is operated at certain predetermined time intervals. Fig. 8 is a side elevation of the mechanism which operates the counter in its normal position before counting. Fig. 9 is a similar view representing the parts in position at the end of a stroke after operating the counter. Fig. 10 is a vertical sectional view of Fig. 9 on the line 10—10 thereof. Fig. 11 is a side elevation of the back ratchet showing the retaining pawl. Fig. 12 is a similar side elevation of the operating ratchet showing the operating pawl. Fig. 13 is a perspective view of the slide located on the scale beam showing its operating arm. Fig. 14 is a perspective view on an enlarged scale of the scale beam and slide and of the member which measures the actual displacement of said slide.

In the drawings, A indicates a chamber interposed in the steam pipe, $A^1$ the upstream side of the pipe, and $A^2$ the downstream side of the pipe.

$a^1$ is the induction compartment of the chamber, and $a^2$ the eduction compartment, the two being separated by an annular wall $a^3$ faced off at its upper edge to form a valve seat for a valve $a$ which is in the form of a flat disk. The height of the said valve above its seat is determined, as will presently appear, by the volume of gas flowing through the chambers.

Below the chamber A is placed the diaphragm B which controls the movement of the valve $a$. This diaphragm is what may be termed a duplex diaphragm and comprises upper and lower members $B^1$, $B^2$ which are braced apart by metallic frames $b$, comprising upper and lower concentric rings $b^1$, $b^2$ and vertically arranged connecting bars $b^3$. The vertical faces of the rings abut against each other and the vertical faces of the upper rings are preferably provided with horizontal engaging shoulders which provide independent supporting means for the frames $b$. The diaphragm members $B^1$, $B^2$ are made of rubber or similar material and are in the form of disks.

The walls of the eduction chamber $a^2$ are flared outwardly as indicated at $a^4$ to form a base for the attachment of the upper diaphragm member $B^1$ the edges of which are secured in place by means of a flat ring C. The edges of the lower diaphragm member $B^2$ are secured between a similar flat ring $C^2$ and the flattened edges of an annular, dished plate $B^4$ which, with the diaphragm member $B^2$, forms a pressure chamber $B^3$.

$C^1$, $C^1$, $C^1$ indicate spacing blocks (see Fig. 3) which hold the rings C, $C^2$ apart, and $C^3$, $C^3$, $C^3$ refer to bolts by means of which the parts are secured together in the relation described. The diaphragm members are preferably provided with a lining $c$ of canvas or other similar fabric at the place of contact with the rings C, $C^2$.

Located centrally of the diaphragm members is a supporting column D which is secured to the diaphragm at its lower end by means of a short bolt and nut and washer $d$, $d^1$ and at its upper end by means of the valve stem E of the valve $a$, which is threaded at its lower end for the purpose, and by a nut and washer $e$, $e^2$. The valve stem E is threaded at its other end for the purpose of attachment to the valve disk $a$ and is secured thereto by means of a nut and washer $f$, $f^1$. An inverted U-shaped strip or plate $E^1$ secured to lugs $e^2$, $e^2$ formed on the upper side of the partition wall $a^3$ (see Fig. 4) serves as a guide for the valve stem as the valve is raised or lowered.

The chamber $B^3$, which is closed by the lower member $B^2$ of the diaphragm B, is connected to the induction compartment $a^1$ of the chamber A by means of a pipe J which enters the compartment $a^1$ at $j$, and the chamber $B^3$ at $j^1$. As the bottom of the eduction compartment $a^2$ is closed by the diaphragm member $B^1$ and as the diaphragm member $B^2$, by the construction above described, receives the pressure that may exist in the induction compartment $a^1$, it is apparent that the position of the diaphragm B, and of the valve $a$ operated by it, will be determined by the difference of these two pressures, and that the height of said valve above its seat at any instant will be proportional to the volume of fluid passing the valve at that instant. When the downstream pipe $A^2$ is opened and fluid begins to flow through it, the pressure in said pipe will fall and with it the pressure in the eduction chamber $a^2$. The greater pressure of the induction chamber will raise the diaphragm B, and with it the valve $a$, against the lesser, back pressure of the eduction chamber (see Fig. 2). When the flow is stopped by closing the downstream pipe $A^2$, the pressure in the induction and eduction chambers will equalize, and thus equalize the pressures on the opposite sides of the diaphragm B, and on opposite sides of the valve $a$. The weight of the parts will then cause the valve to close, as illustrated in Fig. 1. To insure the closing of the valve, the exposed surface of the upper diaphragm member $B^1$ is made slightly greater than that of the lower diaphragm member $B^2$.

G indicates a casing located at one side of the mechanism above described and containing the measuring and registering mechanism and also the second diaphragm which measures the absolute pressure in the induction compartment of the valve chamber. Said casing is secured to the upper ring C in any convenient manner as indicated at $g^1$ $g^2$.

K indicates an oscillatory bar or scale beam pivotally mounted in the casing G on a pin $k$, and extending parallel to a diameter of the diaphragm B.

L indicates a lever pivotally mounted on a bracket arm $L^1$ secured to the casing G as readily to be seen in Fig. 3. Said lever is pivotally connected at one end to the column D in any suitable manner and at the other end by a pin $l$ to the face of the scale beam K, said lever being provided at its end with a fork $l^1$ for engagement with said pin. It is apparent that by this arrangement, the movement up or down of the diaphragm B and the equal movement of the valve $a$ will produce a corresponding angular displacement of the scale beam K, which will be in proportion to the volume passing through the chamber A at any instant.

At the end of the casing G, below the scale beam K, is formed an annular opening which is closed on the inside by means of a diaphragm M, and on the outside by a dished cap plate N,—the two inclosing a chamber $m$. Said diaphragm is made of material similar to that used for the members of the duplex diaphragm B and is secured in place between a flange $n$ of the cap plate N and the outer wall of the casing G. The diaphragm operates against a flat disk O to which is rigidly secured a stem $o$. Said disk O is movably supported at its edges within a ring $m^1$ which is carried by the casing wall. Said stem $o$ passes through an opening in a guide plate $O^1$ which serves to support and guide it in its operation. A flanged nut P is secured to the stem $o$ near the diaphragm M and a coil spring $p$ bearing between said nut and a similar nut $p^x$ abutting against the guide plate $O^1$ acts against the distention of the diaphragm M.

A pipe Q, connected by a suitable joint to the pipe J, as indicated at $j^2$, enters the chamber $m$ at $q$, and connects said chamber with the induction chamber $a^1$. The diaphragm M will thus be subjected to the absolute pressure which exists in the induction compartment of the chamber A, and will be displaced from its normal position an amount proportional to said pressure.

R indicates a lever arm pivotally mounted in the casing back of the scale beam K at $r$. One arm of said lever is provided with an adjustable link $r^1$ to determine its length below the pivotal point $r$.

$R^1$ indicates a link, adjustable in length, which connects the end of the lever arm $r^1$ with the end of the stem $o$.

S indicates a slide on the scale beam K, said slide being provided with rollers $s$ $s^1$ engaging, respectively, the face of the scale beam and the bottom of the same to hold the slide on the beam and to provide frictionless contact therewith (see Figs. 13 and 14). Said slide is provided with an arm $S^2$ extending parallel to the scale beam and pivotally connected to the upper end of the lever R. It is apparent from this construction that any movement of the diaphragm M will, through the stem $o$, the link $R^1$, the lever R, and the arm $S^2$ cause the slide S to move on the scale beam K in proportion as the pressure in the induction compartment $a^1$ of the chamber A increases or decreases. From this description of the slide S, of its arrangement on the scale beam, the connection of the scale beam with the duplex diaphragm B and of the slide with the second diaphragm M,—it is evident that the actual displacement of the slide S from its initial position, indicated in dotted lines in Fig. 1, to a position such, for example, as that illustrated in Fig. 2, in which the scale beam is depressed below its normal level and the slide appears as having been moved along the scale beam, is composed of two movements,—the one along the scale beam proportional to the pressure in the induction compartment of the chamber A, and the one with the scale beam in the angular displacement of the scale beam due to the elevation of the valve $a$ above its seat; and that said actual displacement is therefore proportional to the product of its displacement along the scale beam multiplied by the sine of the angle of displacement of the beam or, in other words, proportional to the product of the absolute pressure times the volume of the steam passing through the valve. I now pass to a description of meter member which measures this actual displacement of the slide S at predetermined, time intervals and of the mechanism which registers this measurement and expresses it in units of weight. The said measuring or meter member consists of a bar T arranged parallel to the scale beam K and adapted to engage a rib $s^2$ formed on the slide S. The bar T is of such a length that it may engage the rib $s^2$ in any position of the slide S on the scale beam K. To compensate for the slight curvature of the path of the slide S, due to the fact that the arm $S^2$ is made integral therewith, the lower edge of the bar T, that is to say, the operating edge which engages the rib $s^2$, is curved, as indicated at $s^3$. Said bar T is secured to one arm of a bell crank lever $t^1$ keyed to a shaft $T^1$ arranged parallel to the scale beam. The other arm of the lever is pivotally connected by means of a link $t$ to a second bell crank lever U pivotally mounted at $u$. The other arm of said last named lever has secured to its end an armature $U^1$ which tends to close on the end of the poles of an electromagnet $U^2$ when said magnet is energized. By a mechanism presently to be described, the member T is normally held in its initial position, as indicated in Fig. 5, wherein it is shown in contact with the rib $s^2$ of the slide S when the said slide has no displacement due to the angular displacement of the scale beam, that is to say, when said angular displacement is equal to zero, in which case the member T cannot move from its initial position. When said slide, however, is displaced below this position the energizing of the magnet $U^2$ tends to pull the armature $U^1$ down to the poles of the magnet to close the magnetic circuit, which causes the member T to descend until it strikes the rib $s^2$ when, as will presently appear, the magnet is deënergized and the member T is caused to return to its initial position in readiness to again measure the displacement of the slide S at the end of the next time interval when the magnet is again energized.

The intervals at which the magnet is energized are determined by a clock mechanism of any convenient type such as that illustrated at V in Fig. 6.

$V^1$ indicates a disk mounted on a shaft geared to the clock mechanism so as to make one rotation every minute or for any other desired unit of time. Said disk is made of insulating material and is provided at one point of its periphery with a notch $V^2$. Arranged near the said disk is a gravity operated, pivoted arm $V^3$ which forms one end of an electric circuit $V^4$ (see Fig. 7) adapted to energize the magnet $U^2$. $V^5$ indicates the other terminal arranged below the arm $V^3$. At the end of each minute, or of whatever other unit of time is consumed by the disk $V^1$ in making a rotation, the end of the pivotal arm $V^3$ drops into the notch $V^2$ and makes contact with the terminal $V^5$, thus closing the electric circuit and energizing the magnet $U^2$. Any other convenient time controlled mechanism for energizing the battery may be adapted. The further rotation of the disk breaks the circuit.

I now pass to a description of the registering mechanism. In the example of my invention illustrated, this mechanism is located near the outer wall of the casing G. The shaft $T^1$, which is rotatively mounted in the walls of the casing G, preferably by means of antifriction bearings, is provided at one end with a segmental gear $T^2$, (see Figs. 3, 8, and 9) which meshes with a pinion $t^2$ formed on a sleeve $t^3$ journaled on a short shaft $t^4$ upon which the counter wheels of a counter $t^5$ are keyed. $T^3$ indicates an arm also made integral with said sleeve $t^3$ and adapted to swing about the shaft $t^4$ with said pinion $t^2$. To the end of said arm $T^3$ are pivotally connected spring controlled pawls $T^4$, $T^5$ adapted to engage the teeth of a ratchet $T^6$. Said pawls are so arranged that when one of them is in engagement with the tooth the other one lies half way between two teeth. The ratchet $T^6$ is formed integrally with a sleeve $t^6$ which is keyed to the shaft $t^4$. $T^7$ indicates a second ratchet also formed integral with said sleeve $t^6$ and of the same diameter as the first named ratchet. It is adapted to be engaged by gravity actuated, retaining pawls $t^7$, $t^8$ which are pivotally secured to a bracket $T^8$ and are adapted to prevent back ratcheting. Said retaining pawls are arranged like the actuating pawls, with one in engagement with a tooth of the back ratchet $T^7$, while the other lies half way between two teeth.

$U^3$ indicates a sickle shaped brake shoe adapted to engage the points of the teeth of the ratchet $T^7$ pivotally secured at the end of an arm $U^4$ formed on a sleeve $U^5$ which is journaled on a screw $U^6$ secured to the bracket $T^8$. $U^7$ indicates an arm also secured to said sleeve $U^5$ and adapted to operate said arm $U^4$. It projects upwardly and to one side of and above the pinion $t^2$ where it is connected with a coil spring $U^8$, the inner end of which is secured to the sleeve $t^3$. It is apparent that, when the pinion $t^2$ is rotated by reason of the oscillation of the segmental gear $T^2$, the coil spring will cause the arm $U^7$ to bring the brake shoe $U^3$ into forcible engagement with the ratchet $T^7$, and thus prevent the same from being operated too rapidly and the pawls from jumping over several teeth at once.

The counter $t^5$ is of any usual construction and is provided with units, tens, hundreds, &c., wheels in the usual manner. By this construction the movement of the member T, to measure the displacement of the slide S, will produce a proportional movement of the segmental gear $T^2$ and a proportional peripheral movement of the wheels in the counter, thus causing a certain number of units to be registered in proportion to the displacement of the slide S. As has been heretofore shown, these units will be units of weight and will represent the amount of fluid by weight which has passed through the chamber A at the end of any interval such, for example, as a minute, depending upon the time interval at which the member T operates. It is to be understood, of course, that the number of units indicated on the counter will only be proportional to the weight of the gas which actually passes and in order to make them indicate the exact amount of gas which has passed, it is necessary by actual measurement to determine the amount of gas which has passed for any given period, to then compare this with the number of units indicated on the counter and to properly calculate the gearing intermediate the member T and the counter so as to make the amount indicated on the counter, agree exactly with the actual measurement. When this is once determined for any particular size of device, the parts may be duplicated and other meters manufactured which will correctly integrate and indicate the weight of steam passing through the meter. Or this gearing may be otherwise correctly calculated in the first instance.

To limit the upward movement of the member T and to insure it always starting from the same point, a bracket W is provided adjacent one arm of the segmental gear $T^2$ provided with a set screw $w$ which is adapted to engage a lug $w^1$ secured to said arm of the segmental gear. This lug is preferably shod with a flat strip of hard rubber $w^3$ to break the jar, when the member T is returned to its normal position. Such return of the member T is insured by the coil spring $U^8$ which normally tends to unwind and thus rotate the pinion $t^2$ in a direction opposite to that in which it is turned when the member T is measuring the displacement of the slide S.

By reason of the graduation of the scale beam, a glance at the position of the slide S thereon will always determine whether the meter is working with the actual pressure of the steam passing through the system, such pressure being readily compared with the indicated pressure of a steam gage. The casing G is provided with a transparent cover X through which the pressure, indicated by the position of the slide S, may be read, and also the registrations of the counter.

When no steam is passing through the chamber A there will be no angular displacement of the scale beam and no vertical displacement of the slide no matter what the pressure or what the position of the slide on the scale beam, and as a result, at the proper time intervals, when the member T tends to descend to measure the displacement of said slide, as it is already in engagement with the slide, it cannot descend and the counter is not operated. Such a condition is illustrated in Figs. 1 and 5, where the slide is in a position indicating pressure but no volume, and the member T, when in its initial position, is in engagement with the slide.

It will be noted that in the preferred construction illustrated in the drawings filed herein, the levers operating the slide S and the scale beam K are so arranged as to produce a greatly exaggerated movement of said parts in comparison with the actual movement of the diaphragm M and of the valve $a$. In this way a mechanism is provided which is very sensitive and which will respond to the slightest variations of either volume or pressure. Said variations are further magnified by the gearing interposed between the meter member T and the counter $t^5$, so that the counter will show and register the passage of steam due to the smallest valve opening.

By the construction of the valve $a$ and its manner of closing upon a flat seat, and by reason of the simple mechanism for guiding it in its movement consisting of the U-shaped strip $E^1$ with the valve stem passing therethrough, my improved device is free from long bearing surfaces or other engaging parts exposed to the action of the steam, to become rusted and thus incapable of free and easy action. All of the operating parts of the meter with the exception of the valve and of the diaphragms are located without the steam chamber so that steam cannot come in contact with them to rust or corrode them and prevent their sensitive and accurate operation at all times. Another advantage results from the fact that the high pressure of the induction chamber acts upon the outside of the valve $a$ and tends to close it against the operation of the duplex diaphragm B. This prevents any possibility of the valve floating when the pressure in the induction chamber is greatly reduced and a partial vacuum is produced therein, as when suction is used in rapidly drawing the steam from the pipe.

The construction of the duplex diaphragm with the supporting frames located between the diaphragm members permits the use of light, pure, gum rubber which results in a very sensitive diaphragm, movable under the slightest variation of pressure.

Other mechanism than diaphragms may be used to cause the movement or displacement of the slide S and the angular displacement of the scale beam K in proper proportion to the volume and pressure of the fluid passing through the valve chamber, but the diaphragm construction described herein is preferable. The apparatus may also be modified in various other ways. For example, mechanism other than the scale beam and slide may be used for communicating to the counter a movement which shall be proportional to the product of volume times the pressure of the fluid passing through the chamber A, but the one illustrated and described is the simplest and most readily and easily operated. It is also particularly adapted to use with the duplex diaphragm shown herein or of any other diaphragm construction. Other means may be used for measuring the displacement of the slide S and any other motive power for operating the measuring means may be adopted. In addition, any other arrangement than a clock movement to produce the proper timed movement of the parts may be selected instead of the one shown and described. In other words, the apparatus may be variously modified and the details of construction and arrangement changed or altered in a number of ways without departing from the spirit of the invention, and I do not wish to be limited in any way to the particular apparatus set forth herein as a preferred embodiment of the invention, except as hereinafter pointed out in the appended claims.

When the fluid to be measured has a constant density, or a practically constant density, as in the case of a liquid, such for example as water, it is apparent that the displacement of the slide along the scale beam will be the same at all times and will remain constant, so that the meter member T will measure only that displacement of the slide due to variations in the angular displacement of the scale beam. The distance measured by said meter member will, in such case, be always proportional to the volume passing through the conduit.

While in illustrating and describing a machine having embodied in it the novel features embraced in my improved meter, I have shown and described certain details of mechanical construction and arrangement, yet manifestly these may be modified and changed in various ways without departing from the spirit of the invention, and I do not wish to be in any way limited thereby except insofar as pointed out in the appended claims.

I claim as my invention:—

1. In an integrating fluid meter, in combination with a fluid conduit, a meter member, means adapted for moving said meter member through a predetermined path at regular predetermined time intervals, means controlled by the density of the fluid passing through the conduit acting to determine the length of the path of said meter member, a counter-operating member, and means controlled by said meter member adapted for moving said counter-operating member proportionately to the movement of said meter member.

2. In an integrating fluid meter, in combination with a fluid conduit, a meter member, means adapted for moving said meter member through a predetermined path at regular predetermined time intervals, mechanism intermediate said meter member and the conduit for determining the length of travel of said meter member at each time interval in accordance with the density of the fluid passing through the conduit, a counter-operating member, and means actuated by said meter member for moving said counter-operating member proportionately to the movement of said meter member.

3. In an integrating fluid meter, in combination with a fluid conduit, a meter member, means for causing said meter member to traverse a predetermined path at regular time intervals, means controlled by the density of the fluid passing through the conduit acting to determine the length of said path, a counter, and means controlled by said meter member for operating said counter to register units in proportion to the lineal units in the length of path of successive movements of said meter member.

4. In an integrating fluid meter, in combination with a fluid conduit, a displacement member adapted to be displaced in two directions, means for displacing said displacement member in one direction in proportion to the volume of fluid passing through the conduit, means for displacing said displacement member in the other direction in proportion to the pressure of the fluid passing through the conduit, means for automatically measuring the resultant displacement of said displacement member at predetermined time intervals, and a register mechanism operated by said measuring means to register units in proportion to the units measured by said measuring means.

5. In an integrating fluid meter, in combination with a fluid conduit, a displacement member having a two-fold displacement, means for controlling one part of said displacement by the volume and means for controlling the other by the pressure of the fluid passing through the conduit, a meter member for measuring said two-fold displacement of said displacement member at predetermined time intervals, means for actuating said meter member, a register mechanism, and means operated by said meter member for operating said register mechanism, said register mechanism registering units in proportion to the units measured by said meter member.

6. In an integrating fluid meter, in combination with a fluid conduit, a valve located in said conduit, means for opening said valve in proportion to the volume passing therethrough, a scale beam and a slide thereon, mechanism intermediate said scale beam and said valve opening means adapted to angularly displace said scale beam in proportion to the opening of said valve, mechanism intermediate said conduit and said slide adapted to displace the slide along said scale beam in proportion to the pressure of the fluid on the upstream side of said valve, a meter member adapted for measuring the resultant displacement of said slide, means for actuating said meter member at predetermined time intervals, a counter adapted for registering units proportioned to the units measured by said meter member, and means controlled by said meter member for operating said counter.

7. In an integrating fluid meter, in combination with a fluid conduit, a chamber located in said conduit having induction and eduction compartments, a valve separating said compartments, means for opening said valve in proportion to the volume of fluid passing through said conduit, a scale beam and slide thereon, mechanism intermediate said valve opening means and said scale beam adapted to angularly displace said scale beam in proportion to the opening of said valve, mechanism intermediate said conduit and said slide adapted to displace said slide on the scale beam in proportion to the pressure in said induction chamber, a meter member adapted for measuring the resultant displacement of said slide due to its displacement along the scale beam and to the displacement of the scale beam itself, means actuating said meter member at predetermined time intervals, a counter indicating units of weight and means controlled by said meter member for operating said counter, the units of said counter being proportioned to the units measured by said meter member.

8. In an integrating fluid meter, in combination with a fluid conduit, a chamber interposed in said conduit, said chamber having induction and eduction compartments, a valve separating said compartments, a diaphragm, means connecting said diaphragm with said valve, means for subjecting one side of said diaphragm to the pressure in the induction compartment, means for subjecting the other side of said diaphragm to the pressure in the eduction compartment of said chamber, a second diaphragm, means for subjecting said second diaphragm to the pressure in said induction compartment, a scale beam and slide thereon, mechanism intermediate said first-named diaphragm and said scale beam adapted to angularly displace said scale beam in proportion to the movement of said first named diaphragm, mechanism intermediate said second diaphragm and said slide adapted to displace said slide along the scale beam in proportion to the movement of said second diaphragm, a meter member adapted for measuring the resultant displacement of said slide, means actuating said meter member at predetermined time intervals, a counter indicating units of weight, the units of said counter being proportioned to the units measured by said meter member, and means controlled by said meter member for operating said counter.

9. An integrating fluid meter comprising, in combination with a fluid conduit, a chamber interposed in said fluid conduit, said chamber having induction and eduction compartments, a valve separating said compartments and adapted to open toward said induction compartment, a diaphragm, means operatively connecting said diaphragm and valve, means for subjecting one side of the diaphragm to the pressure in said induction chamber, means for subjecting the other side of said diaphragm to the pressure in said eduction chamber, a second diaphragm, means for subjecting said second diaphragm to the pressure in said induction chamber, a scale beam and slide thereon, mechanism intermediate said scale beam and said first named diaphragm adapted to angularly displace said scale beam in proportion to the movement of said valve, mechanism intermediate said slide and second named diaphragm adapted to displace said slide on the scale beam in proportion to the movement of said second diaphragm, a meter member adapted for measuring the resultant displacement of said slide due to the two displacements referred to, means actuating said meter member at predetermined time intervals, a counter indicating units of weight, the units of said counter being proportioned to the units measured by said meter member, and means controlled by said meter member for operating said counter.

10. An integrating fluid meter comprising, in combination with a fluid conduit, a chamber interposed in said conduit, said chamber having induction and eduction compartments, a valve separating said compartments, a diaphragm, means operatively connecting said diaphragm and valve, means for subjecting one side of said diaphragm to the pressure of the induction compartment, means for subjecting the other side of said diaphragm to the pressure of the eduction compartment of said chamber, the latter side having a greater superficial area than the former, a scale beam and slide thereon, mechanism intermediate the scale beam and the diaphragm adapted to angularly displace said scale beam as said valve is moved, a second diaphragm, means for subjecting said second diaphragm to the pressure in said induction compartment, mechanism intermediate said second diaphragm and the slide adapted to displace said slide on the scale beam proportionally to the movement of said second diaphragm, a meter member adapted for measuring the twofold displacement of said slide, means actuating said meter member at predetermined time intervals, a counter indicating units of weight, the units of said counter being proportioned to the units measured by said meter member, and means controlled by said meter member for operating said counter.

11. An integrating fluid meter comprising, in combination with a fluid conduit, a chamber interposed in said conduit, said chamber having induction and eduction compartments, a valve separating said compartments and opening toward said induction chamber, a diaphragm, means operatively connecting said diaphragm with said valve, means for subjecting one side of said diaphragm to the pressure of the induction compartment of said chamber, means for subjecting the other side of said diaphragm to the pressure of the eduction compartment of said chamber, the latter side having a slightly greater superficial area than the former, a scale beam and slide thereon, mechanism intermediate the scale beam and said diaphragm adapted to angularly displace said scale beam as said valve is moved, a second diaphragm, means for subjecting said second diaphragm to the pressure in said induction compartment, mechanism intermediate said second diaphragm and the slide adapted to displace said slide on the scale beam proportionally to the movement of said second diaphragm, a meter member adapted for measuring the twofold displacement of said slide, means actuating said meter member at predetermined time intervals, a counter indicating units of weight, the units of said counter being proportioned to the units measured by said meter member, and means controlled by said meter member for operating said counter.

12. In a fluid meter, in combination with a fluid conduit, a chamber interposed in said conduit, said chamber being provided with induction and eduction compartments, an annular partition therebetween separating said compartments, a valve closing against one end of said partition and adapted to open into said induction compartment, a duplex diaphragm, means operatively connecting said diaphragm and valve, said diaphragm comprising two flexible members spaced apart, metallic frames located between and in engagement with the inner faces of said flexible members, separate chambers respectively closed on one side by said flexible members, means connecting one of said chambers with the induction compartment, means connecting the other chamber with the eduction compartment, a scale beam and slide thereon, mechanism intermediate said duplex diaphragm and said scale beam adapted to angularly displace said beam in proportion to the movement of said duplex diaphragm, a second diaphragm, means for subjecting said second diaphragm to the pressure in said induction compartment, mechanism intermediate said second diaphragm and said slide adapted to displace the same along the scale beam in proportion to the movement of said second diaphragm, a meter member adapted for measuring the resultant displacement of said slide, means actuating said meter member at predetermined time intervals, a counter indicating units of weight, the units of said counter being proportioned to the units measured by said meter member, and means controlled by said meter member for operating said counter.

13. In an integrating fluid meter, in combination with a fluid conduit, a valve located in said conduit, means for opening said valve in proportion to the volume passing therethrough, a scale beam and a slide thereon, said scale beam being angularly displaceable about its fulcrum, the said slide being displaceable along said scale beam, mechanism controlled by said valve opening means adapted to produce one of said displacements, mechanism controlled by the pressure of the fluid on the upstream side of said valve adapted to produce the other displacement, a meter member adapted for measuring the resultant displacement of said slide due to both of said displacements referred to, means actuating said meter member at regular predetermined time intervals, a counter adapted for registering units proportioned to the units measured by said meter member, and means controlled by said meter member for operating said counter.

14. In an integrating fluid meter, in combination with a fluid conduit, a chamber located in said conduit having induction and eduction compartments, a valve separating said compartments, a scale beam and slide thereon, said scale beam being adapted to be angularly displaced about its fulcrum and said slide being adapted to be displaced along said scale beam, mechanism operating said valve to raise it in proportion to the volume passing therethrough, means actuated by said mechanism adapted to produce one of said displacements, mechanism controlled by the pressure in said induction chamber adapted to produce the other displacement, a meter member adapted for measuring the resultant displacement of said slide due to its displacement along the scale beam and to the displacement of the scale beam itself, means actuating said meter member at predetermined time intervals, a counter indicating units of weight, the units of said counter being proportioned to the units measured by said meter member, and means controlled by said meter member for operating said counter.

15. In an integrating fluid meter, in combination with a fluid conduit, a chamber interposed in said conduit, said chamber having induction and eduction compartments, a valve separating said compartments, a diaphragm, means operatively connecting said diaphragm with said valve, means for subjecting one side of said diaphragm to the pressure in the induction compartment, means for subjecting the other side of said diaphragm to the pressure in the eduction compartment of said chamber, a second diaphragm, means for subjecting said second diaphragm to the pressure in said induction compartment, a scale beam and a slide thereon, said scale beam being capable of angular displacement about its fulcrum and said slide being capable of displacement along said scale beam, mechanism operated by said first named diaphragm adapted to produce one of said displacements, and mechanism controlled by said second diaphragm adapted to produce the other displacement, a meter member adapted for measuring the resultant displacement of said slide due to both of said above mentioned displacements, means actuating said meter member at predetermined time intervals, a counter indicating units of weight, the units of said counter being proportioned to the units measured by said meter member, and means controlled by said meter member for operating said counter.

16. In an integrating fluid meter comprising, in combination with a fluid conduit, a chamber interposed in said fluid conduit, said chamber having induction and eduction compartments, a valve separating said compartment and adapted to open toward said induction compartment, a diaphragm, means connecting said diaphragm with said valve, means for subjecting one side of said diaphragm to the pressure in said induction compartment, means for subjecting the other side of said diaphragm to the pressure in said eduction compartment, a second diaphragm, means for subjecting said second diaphragm to the pressure in said induction compartment, a scale beam and a slide thereon, said scale beam being displaceable about its fulcrum and said slide being displaceable along said scale beam, mechanism operated by said first named diaphragm adapted to produce one of said displacements, mechanism operated by the second named diaphragm adapted to produce the other displacement, a meter member for measuring the resultant displacement of said slide due to the two displacements referred to, means actuating said meter member at predetermined time intervals, a counter indicating units of weight, the units of said counter being proportioned to the units measured by said meter member, and means controlled by said meter member for operating said counter.

17. An integrating fluid meter comprising, in combination with a fluid conduit, a chamber interposed in said conduit, said chamber having induction and eduction compartments, a valve separating said compartments, a diaphragm, means operatively connecting said diaphragm with said valve, means for subjecting one side of said diaphragm to the pressure in the induction compartment, means for subjecting the other side of said diaphragm to the pressure of the eduction compartment of said chamber, the latter side having a slightly greater superficial area than the former, a scale beam and a slide thereon, said scale beam being displaceable about its fulcrum, and the slide being displaceable along the scale beam, mechanism operated by the diaphragm adapted to produce one of said displacements, a second diaphragm, means for subjecting said second diaphragm to the pressure in said induction compartment, mechanism controlled by said second diaphragm adapted to produce the other displacement, a meter member adapted for measuring the two fold displacement of said slide, means actuating said meter member at predetermined time intervals, a counter indicating units of weight, the units of said counter being proportioned to the units measured by said meter member, and means controlled by said meter member for operating said counter.

18. An integrating fluid meter comprising, in combination with a fluid conduit, a chamber interposed in said conduit, said chamber having induction and eduction compartments, a valve separating said compartments, and opening toward said induction compartment, a diaphragm, means operatively connecting said diaphragm with said valve, means for subjecting one side of said diaphragm to the pressure of the induction compartment of said chamber, means for subjecting the other side of said diaphragm to the pressure of the eduction compartment of said chamber, the latter side having a slightly greater superficial area than the former, a scale beam and slide thereon, said scale beam being displaceable about its fulcrum, and said slide being displaceable along the scale beam, mechanism intermediate said diaphragm and the slide and scale beam adapted to produce one of said displacements, a second diaphragm, means for subjecting said second diaphragm to the pressure in said induction compartment, mechanism intermediate said second diaphragm and the slide and scale beam adapted to produce the other of said displacements, a meter member adapted for measuring the two fold displacement of said slide, means actuating said meter member at predetermined time intervals, a counter indicating units of weight, the units of said counter being proportioned to the units measured by said meter member, and means controlled by said meter member for operating said counter.

19. In an integrating fluid meter, in combination with a fluid conduit, a chamber interposed in said conduit, said chamber being provided with induction and eduction compartments, an annular partition, separating said compartments, a valve adapted to close against one end of said partition and adapted to open into said induction compartment, a duplex diaphragm, means operatively connecting said valve and diaphragm, said diaphragm comprising two flexible members spaced apart, metallic frames located between and in engagement with the inner faces of said flexible members, separate chambers respectively closed on one side by said flexible members, means connecting one of said chambers with the induction compartment, means connecting the other chamber with said eduction compartment, a scale beam and slide thereon said scale beam being displaceable about its fulcrum, and said slide being displaceable along said scale beam, mechanism operated by said duplex diaphragm adapted to produce one of said displacements, a second diaphragm, means for subjecting said second diaphragm to the pressure in said induction compartment, mechanism operated by the latter diaphragm adapted to produce the other of said displacements, a meter member adapted for measuring the resultant displacement of said slide, means actuating said meter member at predetermined time intervals, a counter indicating units of weight, the units of said meter member being proportioned to the units measured by the said meter member, and means controlled by said meter member for operating said counter.

20. In an integrating fluid meter, the combination with a fluid conduit, a chamber interposed in said fluid conduit, said chamber having induction and eduction compartments, an annular partition separating said compartments and forming the side walls of said eduction compartment, a valve closing on one end of said annular partition provided with a valve stem, a U-shaped strap supported above said partition provided with an opening through which said valve stem passes, an annular flange formed on said chamber, said annular flange being located below said eduction compartment, a duplex diaphragm comprising flexible members, rigid frames engaging between said flexible members, means whereby one of said flexible members is secured against the edges of the flange formed on said chamber, a dished plate, to which the edges of the other member of said diaphragm are secured, said dished plate being provided with an opening, means for spacing one of said diaphragm members and said dished plate below said chamber flange a distance equal to the height of said rigid frames and for securing them in position, and a by-pass pipe leading from said induction chamber to said opening in said dished plate.

21. A duplex diaphragm comprising two elastic members, means for supporting said elastic members at their edges, and a plurality of rigid frames located between said elastic members and in supporting engagement therewith.

22. A duplex diaphragm comprising elastic members, means for supporting said elastic members at their edges, and a plurality of interdependently supported rigid frames located between said elastic members and in supporting engagement therewith.

23. In combination with oppositely disposed chambers, a duplex diaphragm comprising oppositely disposed flexible members, means for securing the edges of said flexible diaphragm members in position to close said chambers, concentrically arranged frames located between said flexible members with their opposite faces in engagement with the inner surfaces of said flexible members and means for spacing said chambers apart a distance equal to the height of said frames.

24. In an integrating fluid meter, in combination with a fluid conduit, a chamber interposed in said conduit, said chamber having induction and eduction compartments, a valve separating said compartments, a diaphragm, means operatively connecting said diaphragm with said valve, means for subjecting one side of said diaphragm to the pressure in the induction compartment, means for subjecting the other side of said diaphragm to the pressure in the eduction compartment, a second diaphragm, means for subjecting said second diaphragm to the pressure in said induction compartment, a displacement member adapted for a two fold displacement, means actuated by said first named diaphragm adapted to produce one of said displacements, means actuated by said second diaphragm adapted to produce the other displacement, a meter member adapted for measuring the resultant two fold displacement of said displacement member, means actuating said meter member at predetermined time intervals, a counter indicating units of weight, the units of said counter being proportioned to the units measured by said meter member, and means controlled by said meter member for operating said counter.

25. In an integrating fluid meter, the combination with a fluid conduit, a chamber located in said conduit having induction and eduction compartments, a valve separating said compartments, a diaphragm, means operatively connecting said diaphragm with said valve, means for subjecting one side of said diaphragm to the pressure in the induction compartment, means for subjecting the other side of said diaphragm to the pressure in the eduction compartment of said chamber, the latter side of said diaphragm having a greater superficial area than the former, a displacement member adapted for a two fold displacement, means actuated by said diaphragm adapted to produce one of said displacements, a second diaphragm, means for subjecting said second diaphragm to the pressure in said induction compartment, means actuated by said second diaphragm adapted to control the other displacement of said displacement member, a meter member adapted for measuring the two fold displacement of said displacement member, means for actuating said meter member, a counter indicating units of weight, the units of said meter member being proportioned to the units measured by said meter member, and means controlled by said meter member for operating said counter.

26. An integrating fluid meter comprising, in combination with a fluid conduit, a chamber interposed in said fluid conduit, said chamber having induction and eduction compartments, a valve separating said compartments, and adapted to open toward said induction compartment, a diaphragm, means operatively connecting said diaphragm with said valve, means for subjecting one side of said diaphragm to the pressure in said induction compartment, means for subjecting the other side of said diaphragm to the pressure in said eduction compartment, a second diaphragm, means for subjecting said second diaphragm to the pressure in said induction compartment, a displacement member adapted for a two fold displacement, means actuated by said first named diaphragm adapted to produce one displacement, means actuated by said second named diaphragm adapted to produce the other displacement, a meter member adapted for measuring the resultant displacement of said displacement member due to its two fold displacement, means actuating said meter member at predetermined time intervals, a counter indicating units of weight, the units of said counter being proportioned to the units measured by said meter member, and means controlled by said meter member for operating said counter.

27. An integrating fluid meter comprising, in combination with a fluid conduit, a chamber interposed in said fluid conduit, said chamber having induction and eduction compartments, a valve separating said compartments and opening toward said induction compartment, a diaphragm, means operatively connecting said diaphragm with said valve, means for subjecting one side of said diaphragm to the pressure of the induction compartment of said chamber, means for subjecting the other side of said diaphragm to the pressure of the eduction compartment of said chamber, the latter side having a slightly greater superficial area than the former, a second diaphragm, means for subjecting said second diaphragm to the pressure in said induction compartment, a displacement member adapted for a two fold displacement, mechanism operated by said first named diaphragm adapted to produce the one displacement, mechanism operated by said second named diaphragm to produce the other displacement, a meter member adapted for measuring the combined displacement of said displacement member, means for actuating said meter member, a counter indicating units of weight, the units of said counter being proportioned to the units measured by said meter member, and means controlled by said meter member for operating said counter.

28. In an integrating fluid meter, in combination with a fluid conduit, a chamber interposed in said conduit, said chamber being provided with induction and eduction compartments, an annular partition, separating said compartments, a valve closing against one end of said partition and adapted to open toward said eduction compartment, a duplex diaphragm, means operatively connecting said diaphragm with said valve, said duplex diaphragm comprising two flexible members spaced apart, metallic frames located between and in engagement with the inner faces of said flexible members, diaphragm chambers respectively closed by said flexible members, means connecting one chamber with the induction compartment of said valve chamber and means connecting the other chamber with the eduction compartment, a second diaphragm, means for subjecting said second diaphragm to the pressure in said induction compartment, a displacement member adapted for a two fold displacement, mechanism operated by said first named diaphragm adapted to produce the one displacement, mechanism operated by the second named diaphragm adapted to produce the other displacement, a meter member adapted for measuring the resultant displacement of said displacement member, means for actuating said meter member, a counter indicating units of weight, the units registered by said counter being proportioned to the units measured by said meter member, and means controlled by said meter member for operating said counter.

29. In an integrating fluid meter, in combination with a fluid conduit, a chamber interposed in said conduit, an annular partition formed in said chamber dividing the same into induction and eduction compartments, said partition having its end formed in a plane, a disk valve opening into said induction compartment and adapted to close against the end of said partition, a valve stem secured to said disk valve, means for guiding said valve stem, a diaphragm chamber, means connecting said diaphragm chamber with said eduction compartment, a second diaphragm chamber, means connecting said second diaphragm chamber with said induction compartment, a duplex diaphragm comprising flexible diaphragm members adapted to respectively close said diaphragm chambers, concentrically arranged, rigid frames interposed between said flexible diaphragm members adapted to space the same apart, a central diaphragm-supporting-member secured to said valve stem, registering mechanism, and means for operating the same, and means actuated by said diaphragm for controlling said operating means.

30. In an integrating fluid meter, in combination with a fluid conduit, a displacement member adapted to be displaced in two directions, means for displacing said displacement member in one direction in proportion to the volume of fluid passing through the conduit, means for displacing said displacement member in the other direction in proportion to the pressure of the fluid passing through the conduit, a meter member adapted for measuring the actual displacement of said displacement member and means for actuating said meter member at predetermined time intervals.

31. In an integrating fluid meter, in combination with a fluid conduit, a displacement member adapted for a two fold displacement, means for controlling one part of said displacement by the volume, and means for controlling the other by the pressure, of the fluid passing through the conduit, a meter member adapted for measuring said two fold displacement of said displacement member, and means for actuating said meter member at predetermined time intervals.

32. In an integrating fluid meter, in combination with a fluid conduit, a valve located in said conduit, means for moving said valve distances in proportion to the volume passing therethrough, a scale beam and a slide thereon, mechanism intermediate said scale beam and said valve moving means adapted to angularly displace said scale beam in proportion to the opening of said valve, mechanism intermediate said conduit and said slide adapted to displace the slide along said scale beam in proportion to the pressure of the fluid on the upstream side of said valve, a meter member adapted for measuring the actual displacement of said slide, and means actuating said meter member at predetermined time intervals.

33. In an integrating fluid meter, in combination with a fluid conduit, a chamber interposed in said conduit, said chamber having induction and eduction compartments, a valve separating said compartments, a diaphragm, means operatively connecting said diaphragm with said valve, means for subjecting one side of said diaphragm to the pressure in the induction compartment, means for subjecting the other side of said diaphragm to the pressure in the eduction compartment of said chamber, a second diaphragm, means for subjecting said second diaphragm to the pressure in said induction compartment, a scale beam and slide thereon, mechanism intermediate said first named diaphragm and said scale beam adapted to angularly displace said scale beam in proportion to the movement of said diaphragm, mechanism intermediate said second diaphragm and said slide adapted to displace said slide along the scale beam in proportion to the movement of said second diaphragm, a meter member adapted for measuring the actual displacement of said slide, and means actuating said meter member at predetermined time intervals.

34. An integrating fluid meter comprising, in combination with a fluid meter, a chamber interposed in said fluid conduit, said chamber having induction and eduction compartments, a valve separating said compartments and adapted to open toward said induction compartment, a diaphragm, means operatively connecting said diaphragm with said valve, means for subjecting one side of said diaphragm to the pressure in said induction chamber, means for subjecting the other side of said diaphragm to the pressure in said eduction chamber, a second diaphragm, means for subjecting said second diaphragm to the pressure in said induction chamber, a scale beam and slide thereon, mechanism intermediate said scale beam and said first named diaphragm adapted to angularly displace said scale beam in proportion to the movement of said valve, mechanism intermediate said slide and second named diaphragm adapted to displace said slide on the scale beam in proportion to the movement of said second diaphragm, a meter member adapted for measuring the actual displacement of said slide due to the two displacements referred to, and means actuating said meter member at predetermined time intervals.

35. An integrating fluid meter comprising, in combination with a fluid conduit, a chamber interposed in said conduit, said chamber having induction and eduction compartments, a valve separating said compartments, a diaphragm, means operatively connecting said diaphragm with said valve, means for subjecting one side of said diaphragm to the pressure of the induction compartment, means for subjecting the other side of said diaphragm to the pressure of the eduction compartment of said chamber, the latter side having a greater superficial area than the former, a scale beam and slide thereon, mechanism intermediate the scale beam and the diaphragm adapted to angularly displace said scale beam as said valve is moved, a second diaphragm, means for subjecting said second diaphragm to the pressure in said induction compartment, mechanism intermediate said second diaphragm and the slide adapted to displace said slide on the scale beam proportionally to the movement of said second diaphragm, a meter member adapted for measuring the two fold displacement of said slide, and means actuating said meter member at predetermined time intervals.

36. An integrating fluid meter comprising, in combination with a fluid conduit, a chamber interposed in said conduit, said chamber having induction and eduction compartments, a valve separating said compartments and opening toward said induction chamber, a diaphragm, means operatively connecting said diaphragm with said valve, means for subjecting one side of said diaphragm to the pressure of the induction compartment of said chamber, means for subjecting the other side of said diaphragm to the pressure of the eduction compartment of said chamber, the latter side having a slightly greater superficial area than the former, a scale beam and slide thereon, mechanism intermediate the scale beam and said diaphragm adapted to angularly displace said scale beam as said valve is moved, a second diaphragm, means for subjecting said second diaphragm to the pressure in said induction compartment, mechanism intermediate said second diaphragm and the slide adapted to displace said slide on the scale beam proportionally to the movement of said second diaphragm, a meter member adapted for measuring the two fold displacement of said slide, and means actuating said meter member at predetermined time intervals.

37. In a fluid meter, in combination with a fluid conduit, a chamber interposed in said conduit, said chamber being provided with induction and eduction compartments, an annular partition separating said compartments, a valve closing against one end of said partition and adapted to open into said induction compartment, a duplex diaphragm, means operatively connecting said diaphragm with said valve, said diaphragm comprising two flexible members spaced apart, metallic frames located between and in engagement with the inner faces of said flexible members, chambers respectively closed by said flexible members, means connecting one chamber with the induction compartment, means connecting the other chamber with the eduction compartment, a scale beam and slide thereon, mechanism intermediate said duplex diaphragm and said scale beam adapted to angularly displace said scale beam in proportion to the movement of said duplex diaphragm, a second diaphragm, means for subjecting said second diaphragm to the pressure in said induction compartment, mechanism intermediate said second diaphragm and said slide adapted to displace the same along the scale beam in proportion to the movement of said second diaphragm, a meter member adapted for measuring the actual displacement of said slide, and means actuating said meter member at predetermined time intervals.

38. In an integrating fluid meter, in combination with a fluid conduit, a valve located in said conduit, means for moving said valve in proportion to the volume passing therethrough, a scale beam and slide thereon, said scale beam being angularly displaceable about its fulcrum, and said slide being displaceable along said scale beam, mechanism whereby said valve moving means is adapted to produce one of said displacements, mechanism controlled by the pressure of the fluid on the up stream side of said valve adapted to produce the other displacement, a meter member adapted for measuring the resultant displacement of said slide due to both of said displacements referred to, and means actuating said meter member at predetermined time intervals.

39. In an integrating fluid meter, in combination with a fluid conduit, a chamber located in said conduit having induction and eduction compartments, a valve separating said compartments, a scale beam and slide thereon, said scale beam being adapted to be angularly displaced about its fulcrum and said slide being adapted to be displaced along said scale beam, mechanism operating said valve, means whereby said operating mechanism is adapted to produce one of said displacements, mechanism controlled by the pressure in said induction chamber adapted to produce the other displacement, a meter member adapted for measuring the resultant displacement of said slide due to its displacement along the scale beam and to the displacement of the scale beam itself, and means actuating said meter member at predetermined time intervals.

40. In an integrating fluid meter, in combination with a fluid conduit, a chamber interposed in said conduit, said chamber having induction and eduction compartments, a valve separating said compartments, a diaphragm, means operatively connecting said diaphragm with said valve, means for subjecting one side of said diaphragm to the pressure in the induction compartment, means for subjecting the other side of said diaphragm to the pressure in the eduction compartment of said chamber, a second diaphragm, means for subjecting said second diaphragm to the pressure in said induction compartment, a scale beam and a slide thereon, said scale beam being adapted for angular displacement about its fulcrum and said slide being adapted for displacement along said scale beam, mechanism operated by said first named diaphragm adapted to produce one of said displacements, and mechanism controlled by said second diaphragm adapted to produce the other displacement, a meter member adapted for measuring the resultant displacement of said slide due to both of said above mentioned displacements, and means actuating said meter member at predetermined time intervals.

41. An integrating fluid meter comprising in combination with a fluid conduit, a chamber interposed in said fluid conduit, said chamber having induction and eduction compartments, a valve separating said compartments and adapted to open toward said induction compartment, a diaphragm, means operatively connecting said diaphragm with said valve, means for subjecting one side of said diaphragm to the pressure in said induction compartment, means for subjecting the other side of said diaphragm to the pressure in said eduction compartment, a second diaphragm, means for subjecting said second diaphragm to the pressure in said induction compartment, a scale beam and a slide thereon, said scale beam being displaceable about its fulcrum and said slide being displaceable along said scale beam, mechanism operated by said first named diaphragm adapted to produce one of said displacements, mechanism operated by the second named diaphragm adapted to produce the other displacement, a meter member adapted for measuring the resultant displacement of said slide due to the two displacements referred to, and means actuating said meter member at predetermined time intervals.

42. An integrating fluid meter comprising, in combination with a fluid conduit, a chamber interposed in said conduit, said chamber having induction and eduction compartments, a valve separating said compartments, a diaphragm, means operatively connecting said diaphragm with said valve, means for subjecting one side of said diaphragm to the pressure in the induction compartment, means for subjecting the other side of said diaphragm to the pressure of the eduction compartment of said chamber, the latter side having slightly greater superficial area than the former, a scale beam and a slide thereon, said scale beam being displaceable about its fulcrum, and the slide being displaceable along the scale beam, mechanism operated by said diaphragm adapted to produce one of said displacements, a second diaphragm, means for subjecting said second diaphragm to the pressure in said induction compartment, mechanism controlled by said second diaphragm adapted to produce the other displacement, a meter member adapted for measuring the two fold displacement of said slide, and means actuating said meter member at predetermined time intervals.

43. An integrating fluid meter comprising, in combination with a fluid conduit, a chamber interposed in said conduit, said chamber having induction and eduction compartments, a valve separating said compartments, and opening toward said induction compartment, a diaphragm, means operatively connecting said diaphragm with said valve, means for subjecting one side of said diaphragm to the pressure of the induction compartment of said chamber, means for subjecting the other side of said diaphragm to the pressure of the eduction compartment of said chamber, the latter side having a slightly greater superficial area than the former, a scale beam and slide thereon, said scale beam being displaceable about its fulcrum, and said slide being displaceable along the scale beam, mechanism intermediate said diaphragm and the slide and scale beam adapted to produce one of said displacements, a second diaphragm, means for subjecting said second diaphragm to the pressure in said induction compartment, mechanism intermediate said second diaphragm and the slide and scale beam adapted to produce the other of said displacements, a meter member adapted for measuring the two-fold displacement of said slide, and means for actuating said meter member at predetermined time intervals.

44. In an integrating fluid meter, in combination with a fluid conduit, a chamber interposed in said conduit, said chamber being provided with induction and eduction compartments, an annular partition separating said compartments, a valve closing against one end of said partition and adapted to open into said induction compartment, a duplex diaphragm, means operatively connecting said diaphragm with said valve, said diaphragm comprising two flexible members spaced apart, metallic frames located between and in engagement with the inner faces of said flexible members, chambers respectively closed by said flexible members, means connecting one of said chambers with the induction compartment, means connecting the other chamber with the eduction compartment, a scale beam and slide thereon, said scale beam being displaceable about its fulcrum, and said slide being displaceable along said scale beam, mechanism operated by said duplex diaphragm adapted to produce one of said displacements, a second diaphragm, means for subjecting said second diaphragm to the pressure in said induction compartment, mechanism operated by said second diaphragm adapted to produce the other of said displacements, a meter member adapted for measuring the resultant displacement of said slide, and means for actuating said meter member at predetermined time intervals.

45. In an integrating fluid meter, in combination with a fluid conduit, a chamber interposed in said conduit, said chamber having induction and eduction compartments, a valve separating said compartments, a diaphragm, means operatively connecting said diaphragm with said valve, means for subjecting one side of said diaphragm to the pressure in the induction compartment, means for subjecting the other side of said diaphragm to the pressure in the eduction compartment of said chamber, a second diaphragm, means for subjecting said second diaphragm to the pressure in said induction compartment, a displacement member adapted for a two-fold displacement, means actuated by said first named diaphragm adapted to produce one displacement, means actuated by said second named diaphragm adapted to produce the other displacement, a meter member adapted for measuring the resultant two-fold displacement of said displacement member, and means actuating said meter member at predetermined time intervals.

46. In an integrating fluid meter, the combination with a fluid conduit, a chamber located in said conduit, having induction and eduction compartments, a valve separating said compartments, a diaphragm, means operatively connecting said diaphragm with said valve, means for subjecting one side of said diaphragm to the pressure in the induction compartment, means for subjecting the other side of said diaphragm to the pressure in the eduction compartment of said chamber, the latter side of said diaphragm having a greater superficial area than the former, a displacement member adapted for a two-fold displacement, means actuated by said diaphragm adapted to produce one displacement, a second diaphragm, means for subjecting said second diaphragm to the pressure in said induction compartment, means actuated by said second diaphragm adapted to control the other displacement of said displacement member, a meter member adapted for measuring the two-fold displacement of said displacement member, and means actuating said meter member at predetermined time intervals.

47. An integrating fluid meter comprising, in combination with a fluid conduit, a chamber interposed in said fluid conduit, said chamber having induction and eduction compartments, a valve separating said compartments and adapted to open toward said induction compartment, a diaphragm, means operatively connecting said diaphragm with said valve, means for subjecting one side of said diaphragm to the pressure in said induction chamber, means for subjecting the other side of said diaphragm to the pressure in said eduction chamber, a second diaphragm, means for subjecting said second diaphragm to the pressure in said induction chamber, a displacement member adapted for a two-fold displacement, means actuated by said first named diaphragm adapted to produce one displacement, means actuated by said second named diaphragm adapted to produce the other displacement, a meter member adapted for measuring the resultant displacement of said displacement member due to its two-fold displacement, and means actuating said meter member at predetermined time intervals.

48. An integrating fluid meter comprising, in combination with a fluid conduit, a chamber interposed in said fluid conduit, said chamber having induction and eduction compartments, a valve separating said compartments and opening toward said induction compartment, a diaphragm, means operatively connecting said diaphragm with said valve, means for subjecting one side of said diaphragm to the pressure of the induction compartment of said chamber, means for subjecting the other side of said diaphragm to the pressure of the eduction compartment of said chamber, the latter side having a slightly greater superficial area than the former, a second diaphragm, means for subjecting said second diaphragm to the pressure in said induction compartment, a displacement member adapted for a two-fold displacement, mechanism operated by said first named diaphragm adapted to produce the one displacement, mechanism operated by said second named diaphragm adapted to produce the other displacement, a meter member adapted for measuring the combined displacement of said displacement member, and means for actuating said meter member.

49. In an integrating fluid meter, in combination with a fluid conduit, a chamber interposed in said conduit, said chamber being provided with induction and eduction compartments, an annular partition separating said compartments, a valve closing against one end of said partition and adapted to open toward said induction compartment, a duplex diaphragm, means operatively connecting said diaphragm with said valve, said diaphragm comprising two flexible members spaced apart, metallic frames located between and in engagement with the inner faces of said flexible members, diaphragm chambers respectively closed by said flexible members, means connecting one chamber with the induction compartment of said valve chamber, means connecting the other chamber with the eduction compartment, a second diaphragm, means for subjecting said second diaphragm to the pressure in said induction compartment, a displacement member adapted for a two-fold displacement, mechanism operated by said first named diaphragm adapted to produce the one displacement, mechanism operated by the second named diaphragm adapted to produce the other displacement, a meter member adapted for measuring the resultant displacement of said displacement member, and means actuating said meter member.

50. In an integrating fluid meter, in combination with a fluid conduit, a chamber interposed in said conduit, an annular partition formed in said chamber dividing the same into induction and eduction compartments, said partition having one end formed in a plane, a disk valve opening into said induction compartment and adapted to close against the end of said partition, a valve stem secured to said disk valve, means for guiding said valve stem, a diaphragm chamber, means connecting said diaphragm chamber with said eduction compartment, a second diaphragm chamber, means connecting said second diaphragm chamber with said induction compartment, a duplex diaphragm comprising flexible diaphragm members adapted to respectively close said diaphragm chambers, concentrically arranged, rigid frames interposed between said flexible diaphragm members adapted to space the same apart, a central diaphragm-supporting-member secured to said valve stem, a displacement member, means actuated by said duplex diaphragm for operating said displacement member, a meter member adapted for measuring the displacement of said displacement member, and means for actuating said meter member.

51. In a fluid meter, in combination with a fluid conduit, a diaphragm, means for subjecting said diaphragm to a differential pressure which varies in proportion to the volume passing through the conduit, a second diaphragm, means for subjecting said second diaphragm to the pressure in the conduit, a scale beam adapted to be angularly displaced about its fulcrum point, a lever arm having pivotal connection at one end with one of said diaphragms and at its other end to said scale beam, a slide movable along said scale beams, a second lever, means operatively connecting one end of said second lever with the other of said diaphragms, and means operatively connecting the opposite end of said second lever with said slide.

52. In a fluid meter, in combination with a fluid conduit, a diaphragm, means for subjecting said diaphragm to a differential pressure which varies in proportion to the volume passing through the conduit, a second diaphragm, means for subjecting said second diaphragm to the pressure in the conduit, a scale beam adapted to be angularly displaced about its fulcrum point, a lever arm having pivotal connection at one end with one of said diaphragms and at its other end to said scale beam, a slide movable along said scale beam, a second lever, means operatively connecting one end of said second lever with the other of said diaphragms, means operatively connecting the opposite end of said second lever with said slide, and means for measuring the resultant displacement of said slide.

53. In a fluid meter, in combination with a fluid conduit, a diaphragm, means for subjecting said diaphragm to a differential pressure which varies in proportion to the volume passing through the conduit, a second diaphragm, means for subjecting said second diaphragm to the pressure in the conduit, a scale beam adapted to be angularly displaced about its fulcrum point, a lever arm having pivotal connection at one end with one of said diaphragms and at its other end with said scale beam, a slide movable along said scale beam, a second lever, means operatively connecting one end of said second lever with the other of said diaphragms, means operatively connecting the opposite end of said second lever with said slide, a meter member adapted to measure the resultant displacement of said slide, and means for actuating said meter member.

54. In a fluid meter, in combination with a fluid conduit, a diaphragm, means for subjecting said diaphragm to a differential pressure which varies in proportion to the volume passing through the conduit, a second diaphragm, means for subjecting said second diaphragm to the pressure in the conduit, a scale beam adapted to be angularly displaced about its fulcrum point, a lever arm having pivotal connection at one end with one of said diaphragms and at its other end to said scale beam, a slide movable along said scale beam, a second lever, means operatively connecting one end of said second lever with the other of said diaphragms, means operatively connecting the opposite end of said second lever with said slide, a meter member adapted for measuring the resultant displacement of said slide, means for actuating said meter member, and means for registering the movements of said meter member.

55. In an integrating fluid meter, in combination with a fluid conduit, a diaphragm, means for subjecting said diaphragm to a differential pressure which varies in proportion to the volume passing through said conduit, a second diaphragm, means for subjecting said second diaphragm to the pressure in said conduit, a scale beam adapted to be angularly displaced about its fulcrum point, a lever arm having pivotal connection at one end with said first named diaphragm and at its other end with said scale beam, a slide movable along said scale beam, a second lever, means operatively connecting one end of said second lever with the other of said diaphragms, means operatively connecting the opposite end of said second lever with said slide, a meter member adapted for measuring the resultant displacement of said slide, means actuating said meter at predetermined time intervals, a counter, registering units proportional to the units measured by said meter member, and means controlled by said meter member for operating said counter.

56. In an integrating fluid meter, in combination with a fluid conduit, a diaphragm, means for subjecting said diaphragm to a differential pressure which varies in proportion to the volume passing through said conduit, a second diaphragm, means for subjecting said second diaphragm to the pressure in said conduit, a scale beam adapted to be angularly displaced about its fulcrum point, a lever arm having pivotal connection at one end with one of said diaphragms and at its other end with said scale beam, a slide movable along said scale beam, a second lever, means operatively connecting one end of said second lever with the other of said diaphragms, means operatively connecting the opposite end of said second lever with said slide, a meter member adapted for measuring the resultant displacement of said slide, means for actuating said meter member, a counter registering units proportional to the units measured by said meter member, and means controlled by said meter member for operating said counter.

57. In an integrating fluid meter, in combination with a fluid conduit, a diaphragm, means for subjecting said diaphragm to a differential pressure which varies in proportion to the volume passing through said conduit, a second diaphragm, means for subjecting said second diaphragm to the pressure in the conduit, a scale beam adapted to be angularly displaced about its fulcrum point, a lever arm having pivotal connection at one end to said first named diaphragm and at its other end to said scale beam, a slide movable along said scale beam, a second lever, means operatively connecting one end of said second lever with the other of said diaphragms, means operatively connecting the opposite end of said second lever with said slide, a meter member adapted for measuring the resultant displacement of said slide, means for actuating said meter member, a counter indicating units of weight, the units of said counter being proportional to the units measured by said meter member, and means controlled by said meter member for operating said counter.

58. In an integrating fluid meter, in combination with a fluid conduit, a chamber interposed in said conduit, said chamber having induction and eduction compartments, a valve separating said compartments, a pressure member, means operatively connecting said pressure member with said valve, means for subjecting one side of said pressure member to the pressure in the induction compartment, means for subjecting the other side of said pressure member to the pressure in the eduction compartment of said chamber, a second pressure member, means for subjecting said second pressure member to the pressure in said induction compartment, a displacement member adapted for a two-fold displacement, means actuated by said first named pressure member adapted to produce one displacement, means actuated by said second named pressure member adapted to produce the other displacement, a meter member adapted for measuring the resultant two-fold displacement of said displacement member, and means actuating said meter member at predetermined time intervals.

59. In an integrating fluid meter, in combination with a fluid conduit, a chamber interposed in said conduit, said chamber having induction and eduction compartments, a valve separating said compartments, a pressure member, means operatively connecting said pressure member with said valve, means for subjecting one side of said pressure member to the pressure in the induction compartment, means for subjecting the other side of said pressure member to the pressure in the eduction compartment of said chamber, a second pressure member, means for subjecting said second pressure member to the pressure in said induction compartment, a displacement member adapted for a two-fold displacement, means actuated by said first named pressure member adapted to produce one displacement, means actuated by said second named pressure member adapted to produce the other displacement, a meter member adapted for measuring the resultant two-fold displacement of said displacement member, means for actuating said meter member at regular predetermined time intervals, a counter registering units proportional to the units measured by said meter member, and means controlled by said meter member for operating said counter.

60. In an integrating fluid meter, in combination with a fluid conduit, a chamber interposed in said conduit, said chamber having induction and eduction compartments, a valve separating said compartments, said valve being openable toward said induction chamber, a pressure member, means operatively connecting said pressure member with said valve, means for subjecting one side of said pressure member to the pressure in the induction compartment, means for subjecting the other side of said pressure member to the pressure of the eduction compartment of said chamber, a second pressure member, means for subjecting said second pressure member to the pressure in said induction compartment, a displacement member adapted for a two-fold displacement, means actuated by said first named pressure member adapted to produce one displacement, means actuated by said second named pressure member adapted to produce the other displacement, a meter member adapted for measuring the resultant two-fold displacement of said displacement member, and means for actuating said meter member at predetermined time intervals.

61. In an integrating fluid meter, in combination with a fluid conduit, a chamber interposed in said conduit, said chamber having induction and eduction compartments, a valve separating said compartments and being openable toward said induction compartment, a pressure member, means operatively connecting said pressure member with said valve, means for subjecting one side of said pressure member to the pressure in the induction compartment, means for subjecting the other side of said pressure member to the pressure in the eduction compartment of said chamber, the latter side of said pressure member being of slightly greater area than the former, a second pressure member, means for subjecting said second pressure member to the pressure in said induction compartment, a displacement member adapted for a two-fold displacement, means actuated by said first named pressure member adapted to produce one displacement, means actuated by said second named pressure member adapted to produce the other displacement, a meter member adapted for measuring the resultant two-fold displacement of said displacement member, and means for actuating said meter member at predetermined time intervals.

62. In an integrating fluid meter, in combination with a fluid conduit, a chamber interposed in said conduit, said chamber having induction and eduction compartments, a valve separating said compartments, a pressure member, means operatively connecting said pressure member with said valve, means for subjecting one side of said pressure member to the pressure in the induction compartment, means for subjecting the other side of said pressure member to the pressure in the eduction compartment of said chamber, a displacement member, means intermediate said pressure member and said displacement member for operating the latter, a meter member adapted for measuring the displacement of said displacement member, and means for actuating said meter member at predetermined time intervals.

63. In an integrating fluid meter, in combination with a fluid conduit, a chamber interposed in said conduit, said chamber having induction and eduction compartments, a valve separating said compartments, said valve being openable toward said induction compartment, a pressure member, means operatively connecting said pressure member with said valve, means for subjecting one side of said pressure member to the pressure in the induction compartment, means for subjecting the other side of said pressure member to the pressure in said eduction compartment of said chamber, a displacement member, means intermediate said pressure member and said displacement member for operating the latter, a meter member adapted for measuring the displacement of said displacement member, and means for actuating said meter member at predetermined time intervals.

64. In an integrating fluid meter, in combination with a fluid conduit, a chamber interposed in said conduit, said chamber having induction and eduction compartments, a valve separating said compartments, said valve being openable toward said induction compartment, a pressure member, means operatively connecting said pressure member with said valve, means for subjecting one side of said pressure member to the pressure in the induction compartment, means for subjecting the other side of said pressure member to the pressure in the eduction compartment of said chamber, the latter side of said pressure member being of slightly greater area than the former, a displacement member, means intermediate said pressure member and said displacement member for operating the latter, a meter member adapted for measuring the displacement of said displacement member, and means actuating said meter member at predetermined time intervals.

65. In an integrating fluid meter, in combination with a fluid conduit, a displacement member, means for displacing said displacement member in proportion to the density of the fluid passing through the conduit, a meter member adapted to measure the displacement of said displacement member, an electro-magnet, and a circuit adapted to energize said electro-magnet, time controlled mechanism adapted to close the circuit of said magnet, an armature tending to close the magnetic circuit of said magnet, and mechanism intermediate said armature and said meter member adapted to operate said meter member upon the closing of the energizing circuit.

In testimony, that I, claim the foregoing as my invention I affix my signature in the presence of two witnesses, this 10th day of August A. D. 1909.

ARTHUR G. ALEXANDER.

Witnesses:
 CLARENCE E. MEHLHOPE,
 GEORGE R. WILKINS.

---

Copies of this patent may be obtained for five cents each, by addressing the "Commissioner of Patents, Washington, D. C."